US008374091B2

(12) United States Patent
Chiang

(10) Patent No.: US 8,374,091 B2
(45) Date of Patent: Feb. 12, 2013

(54) TCP EXTENSION AND VARIANTS FOR HANDLING HETEROGENEOUS APPLICATIONS

(75) Inventor: Mung Chiang, Cherry Hill, NJ (US)

(73) Assignee: Empire Technology Development LLC, Wilmington, DE (US)

( * ) Notice: Subject to any disclaimer, the term of this patent is extended or adjusted under 35 U.S.C. 154(b) by 383 days.

(21) Appl. No.: 12/411,405

(22) Filed: Mar. 26, 2009

(65) Prior Publication Data

US 2010/0246398 A1   Sep. 30, 2010

(51) Int. Cl.
  *G01R 31/08* (2006.01)
  *G06F 15/16* (2006.01)
(52) U.S. Cl. ............... 370/236; 370/252; 709/235
(58) Field of Classification Search .......... 370/229, 370/230, 231, 236, 249, 252, 310, 410, 412; 709/206, 228, 232, 233, 234, 235, 245
See application file for complete search history.

(56) References Cited

U.S. PATENT DOCUMENTS

| | | | |
|---|---|---|---|
| 6,215,769 B1 * | 4/2001 | Ghani et al. ................ | 370/230 |
| 6,535,515 B1 * | 3/2003 | Hasegawa et al. ....... | 370/395.52 |
| 6,591,382 B1 * | 7/2003 | Molloy et al. ............ | 714/704 |
| 6,757,248 B1 * | 6/2004 | Li et al. .................... | 370/235 |
| 7,047,312 B1 * | 5/2006 | Aweya et al. ............ | 709/235 |
| 7,295,512 B2 * | 11/2007 | Takatani et al. .......... | 370/229 |
| 2002/0150048 A1 * | 10/2002 | Ha et al. ................... | 370/231 |
| 2003/0123394 A1 * | 7/2003 | Neale et al. .............. | 370/235 |
| 2005/0018617 A1 * | 1/2005 | Jin et al. ................... | 370/252 |
| 2005/0286416 A1 * | 12/2005 | Shimonishi et al. ...... | 370/229 |
| 2006/0209838 A1 * | 9/2006 | Jung et al. ................ | 370/394 |
| 2007/0121506 A1 * | 5/2007 | Wydrowski et al. ...... | 370/231 |
| 2007/0195797 A1 * | 8/2007 | Patel et al. ................ | 370/400 |
| 2008/0089228 A1 * | 4/2008 | Lin et al. .................. | 370/230 |
| 2008/0304413 A1 * | 12/2008 | Briscoe et al. ........... | 370/235 |
| 2009/0006920 A1 * | 1/2009 | Munson et al. ........... | 714/748 |
| 2009/0059958 A1 * | 3/2009 | Nakata ...................... | 370/474 |
| 2009/0141631 A1 * | 6/2009 | Kim et al. ................. | 370/235 |
| 2009/0287968 A1 * | 11/2009 | Lee et al. .................. | 714/699 |

OTHER PUBLICATIONS

Benjamin Wah, Transport Layer, Wiley Encyclopedia of Computer Science and Engineering, 2008, p. 1-8.
Mung Chiang, Balancing Transport and Physical Layers in Wireless Multihop Networks: Jointly Optimal Congestion Control and Power Control, IEEE Journal on selected areas in communications, Jan. 2005, p. 104-116, vol. 23, No. 1.

* cited by examiner

*Primary Examiner* — Michael Thier
*Assistant Examiner* — Prince A Mensah
(74) *Attorney, Agent, or Firm* — Ren-Sheng International

(57) ABSTRACT

An extension to TCP is generally provided that allows TCP to handle heterogeneous applications, especially those with delay and smoothness-sensitive contents, and wireless transmission media having noisy, fading radio channels. The TCP extension decouples reliability control from rate control, sacrificing reliability for delay control (transmission rate and retransmission decision) that may be suitable for delay and smoothness-sensitive contents. Furthermore, the TCP extension may select TCP variants and modifications to the TCP variants based on one or more of application needs, channel conditions, or local observables such as loss and delay to better adapt to different types of applications and physical layers.

33 Claims, 6 Drawing Sheets

TCP EXTENSION AND VARIANTS FOR HANDLING HETEROGENEOUS APPLICATIONS

BACKGROUND

Description of the Related Art

Unless otherwise indicated herein, the approaches described in this section are not prior art to the claims in this application and are not admitted to be prior art by inclusion in this section.

To communicate data over a network, client and server computers may each run analogous Internet protocol (IP) stacks, with data being passed down the stack from the sending application, and then up the receiver's stack to the receiving application. A typical IP stack includes a physical layer, a link layer, a network layer (e.g., IP), a transport layer, and an application. The most commonly used transportation layer protocols is the Transmission Control Protocol (TCP). TCP provides a reliable and connection-based service, which means it ensures packets are correctly received and in the order in which they are sent. One of the reasons that TCP is so widely used is because many firewalls exclude non-TCP traffic.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
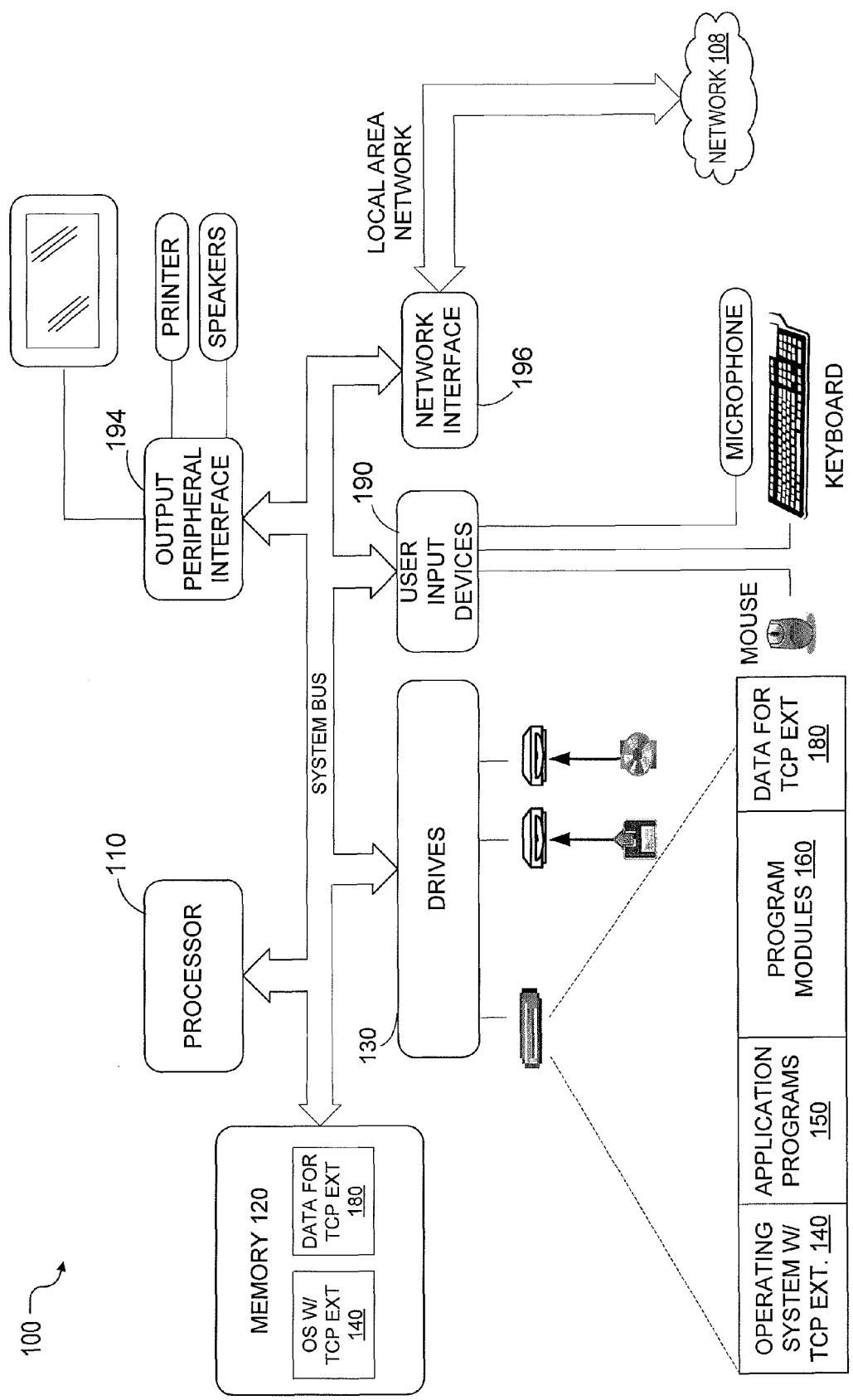
FIG. 1 illustrates an example computer for implementing embodiments of client or server computer with TCP extensions.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Briefly stated, the present disclosure generally relates to an extension to a Transmission Control Protocol (TCP) that may allow TCP to handle heterogeneous applications, especially those with delay and smoothness-sensitive contents, and wireless transmission media having noisy, fading radio channels. The TCP extension may decouple reliability control from rate control, sacrificing reliability for delay control (transmission rate and retransmission decision) that may be suitable for delay and smoothness-sensitive contents. Furthermore, the TCP extension may select TCP variants and modifications to the TCP variants based on one or more of application needs, channel conditions, or local observables such as loss and delay to better adapt to different types of applications and physical layers.

TCP communications generally use a window-based congestion control mechanism that combines rate and reliability control mechanisms. In a typical implementation, a transmission control module takes as inputs a congestion window size W and packet acknowledgements from the network. The transmission control module transmits a number of packets at a time up to the congestion window size W. For reliability control, the transmission control module waits for packet acknowledgements from the receiver before sending more packets. The transmission control module detects a packet loss when three duplicate packets acknowledgements have been received or a timeout expires before a packet acknowledgement is received for the packet. For end-to-end flow control, the transmission control module receives a receive window size in packet acknowledgments from the receiver. The receive window size specifies the amount of additional data the receiver is willing to buffer for the connection. The transmission control module transmits data up to the smaller of the receiver window size and the congestion window size.

For congestion avoidance, a congestion estimator provides an estimate of the network congestion level to a window control module, and the window control module may provide the congestion window size W to the transmission control module. In some TCP congestion avoidance algorithms called TCP Reno, the congestion estimator starts the sender in a slow start phase with an initial congestion window size of two packets. It also doubles the congestion window size every round-trip time until it detects a lost packet at a time referred to as the slow start threshold. Afterwards, the sender enters the congestion avoidance phase. In the congestion avoidance phase, the sender uses Additive Increase Multiplicative Decrease (AIMD) adjustments where the congestion window size is increased by one packet every round-trip time when all the packets are successfully received. When the TCP Reno congestion avoidance algorithm detects a packet is lost, the sender halves the congestion window size.

As described above, the present disclosure appreciates that the transmission control module of TCP uses both reliability control and congestion avoidance to set the transmission rate. Such an arrangement may create a problem for downloading media rich contents that are delay and smoothness-sensitive. This is because reliability control would redeliver stale packets and delay the delivery of new packets. The arrangement may also create a problem for a wireless physical layer with a noisy, fading radio channel. This is because congestion avoidance would reduce the congestion window instead of increasing the transmission rate to compensate for the noisy, fading radio channel. Nonetheless, TCP is still the preferred transport protocol because of firewall constraints even though its reliability and congestion control mechanisms make it less than ideal for modern applications. In consideration of the above and other features of TCP, the present disclosure identifies methods and systems that update the operational principles of TCP to make it more flexible for heterogeneous contents and physical layers.

This disclosure is drawn, inter alia, to methods, apparatus, computer programs and systems related to an extension to TCP that allows TCP to handle heterogeneous applications, especially those with delay and smoothness-sensitive contents, and wireless transmission media having noisy, fading radio channels. To do so, the TCP extension decouples reliability control from rate control so 100% reliability may be sacrificed for delay control (transmission rate and retransmission decision) that is suitable for delay and smoothness-sensitive contents. Furthermore, the TCP extension selects TCP variants and modifications to the TCP variants based on application needs, channel conditions, and local observables such as loss and delay to better adapt to different types of applications and wireless transmission media.

With reference to FIG. 1, depicted is an example computer 100 for implementing embodiments of client or server computer with TCP extensions in accordance with the present disclosure. Computer 100 includes a processor 110, memory 120 and one or more drives 130. The drives 130 and their associated computer storage media may provide storage of computer readable instructions, data structures, program modules and other data for computer 100. Drives 130 may include an operating system 140 with TCP extension, application programs 150, program modules 160, and data 180 for TCP extension. Processor 110 may load operating system 140 with TCP extension into memory 120, execute operating system 140 to modify data 180 for TCP extension, and save data 180 in storage drives 130.

Computer 100 may further includes input devices 190 through which commands and data may be entered. Input devices may include an electronic digitizer, a microphone, a keyboard and pointing device, commonly referred to as a mouse, trackball, or touch pad. Other input devices may include a joystick, game pad, satellite dish, scanner, or the like. These and other input devices may be coupled to processor 110 through a input interface that is coupled to a system bus, or may be coupled by some other interface and/or bus structures, such as a parallel port, game port or a universal serial bus (USB). Computer 100 may also include other peripheral output devices such as speakers, which may be coupled through an output peripheral interface 194 or the like.

Computer 100 may operate in a networked environment using logical communication links to one or more computers, such as a remote computer coupled to a network interface 196. The remote computer may be a personal computer, a server, a router, a network PC, a mobile phone, a peer device, or other common network node, and may include many or all of the elements described above relative to computer 100. Networking environments are commonplace in offices, enterprise-wide area networks (WAN), local area networks (LAN), intranets and the Internet. For example, in the subject matter of the present application, computer 100 may comprise the source machine from which data is being migrated, and the remote computer may comprise the destination machine or vice versa. Note however, that source and destination machines need not be linked by a network 108 or any other means, but instead, data may be migrated via any media capable of being written by the source platform and read by the destination platform or platforms. When used in a LAN or wireless LAN (WLAN) networking environment, computer 100 may be linked to the LAN through network interface 196 or an adapter. When used in a WAN networking environment, computer 100 typically includes a modem or other means for establishing communications over the WAN, such as the Internet or network 108. It will be appreciated that other means of establishing a communications link between the computers may be used.

According to one embodiment, computer 100 may be coupled to a networking environment such that the processor 110 and/or operating system 140 may perform with or as the TCP extension in accordance with embodiments herein.

Figure 2:
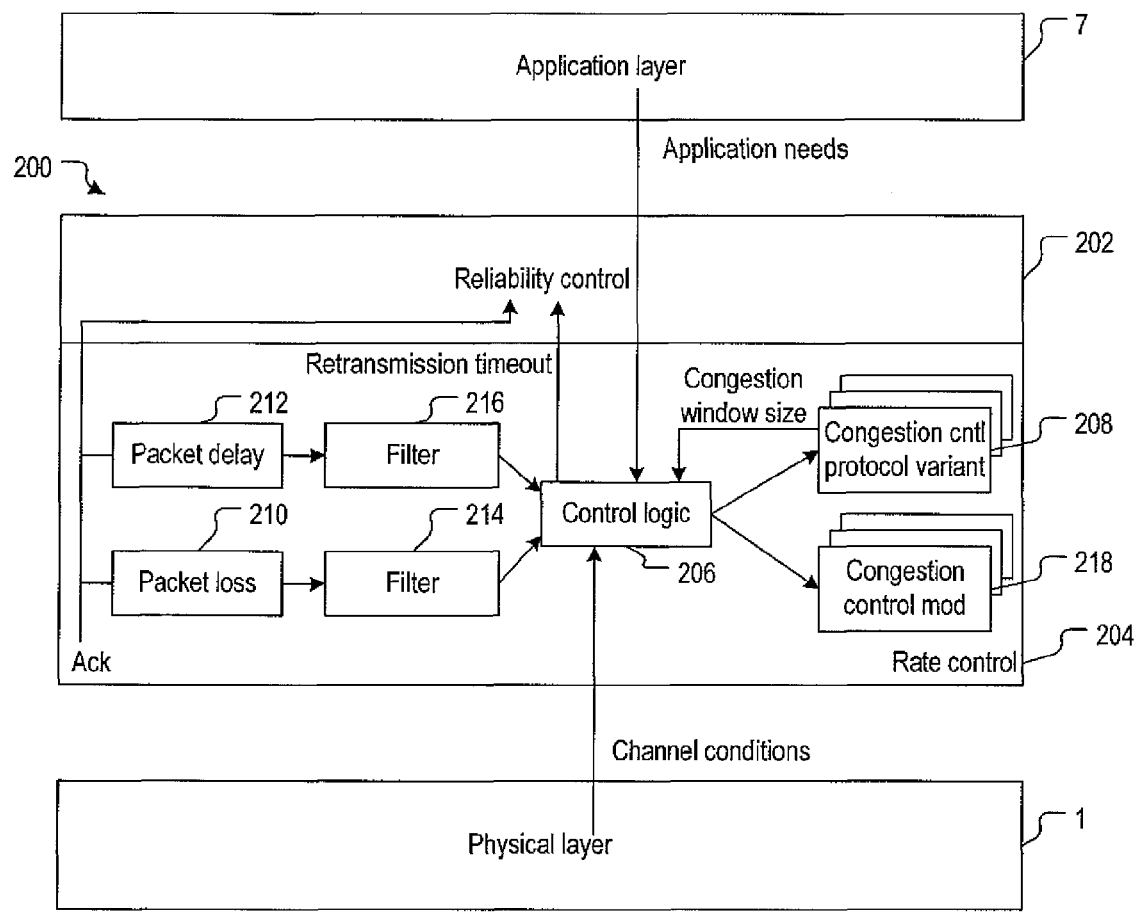
FIG. 2 is a block diagram illustrating the program modules of a TCP extension executed by a processor.

FIG. 2 is a block diagram illustrating the program modules of a TCP extension 200 executed by a processor 110 (FIG. 1), arranged in accordance with at least some embodiments of the present disclosure. TCP extension 200 is part of the TCP protocol in the transport layer above the physical layer 1 and below the application layer 7 in the IP stack. TCP extension 200 may include a reliability control module 202 decoupled from a rate control module 204 with congestion avoidance so that the rate control module sets the transmission rate of a transmit buffer (not shown) independently from the reliability control module. Although not shown, the TCP protocol in the transportation layer may include other mechanisms that perform conventional addressing, connection establishment and termination, data handling and packaging, and data transfer.

Rate control module 204 may include a control logic 206 that may select one of multiple variants 208 of the TCP congestion control protocol based on the accuracies of local observables such as packet loss and packet delay. Congestion control protocol variants 208 may include TCP Vegas, FAST (Fast Active queue management Scalable TCP) TCP, TCP Tahoe, TCP Reno, TCP NewReno, and TCP Illinois. The selected congestion control protocol variant 208 may adjust the congestion window size in response to congestion signals from network 108 (FIG. 1), and may provide the congestion window size to control logic 206. Control logic 206 may set the transmission rate based on the congestion window size A packet loss block 210 may determine the instantaneous packet loss information (hereafter "packet loss") in a session based on packet acknowledgements from the receiver. Packet loss block 210 may also track the variation of the packet loss, which indicates the accuracy of the packet loss value. A packet delay block 212 may determine the instantaneous packet delay information (hereafter "packet delay") in the session based on the packet acknowledgements from the receiver. Packet delay block 212 may also track the variation of the packet delay, which may indicate the accuracy of the packet delay value.

Filters 214 and 216 respectively may prioritize the usage of the packet loss and the packet delay by assigning weights to the two values. The values of the packet loss and the packet delay may be weighted because even though delay is more useful than loss since it may be used to prevent loss instead of simply detect loss, the detection of delay may be less accurate than the detection of loss since delay is more sensitive to noise. In some embodiments, the packet delay may be weighted less than the packet loss but the packet delay may be sampled more frequently than the packet loss. Filters 214 and 216 also respectively may determine the moving averages of the packet loss and the packet delay over a time window. The length of the time window may depend on the application needs. For example, the time window may be three times the average duration of the application stream for this particular application. Filters 214 and 216 may provide the variations of the packet loss and the packet delay over the time window to control logic 206 so the block may select a congestion control protocol variant. Filters 214 and 216 may also provide the moving averages of the packet loss and the packet delay to the selected congestion control protocol variant so the variant may adjust the congestion window size.

Control logic 206 may also select one of multiple modifications 218 to the underlying congestion control protocol variants 208 based on the needs of the application layer 7 and the conditions of the physical layer 1. Congestion control modifications 218 may include TCP Westwood, TCP RTM (Real Time Mode), and TCP SMO (Single-source Multicast Optimization). Whereas congestion control protocol variants 208 may adjust the congestion window sizes in different way in response to congestion signals from network 108, congestion control modifications 218 may provide additional semantics and functions to the window size adjustment variants to suit the needs of specific applications.

Reliability control module 202 may receive the application needs from rate control module 204. Reliability control module 202 may also monitor packet acknowledgements from the receiver and may determine packet loss. Based on the application needs, reliability control module 202 may determine when a lost packet needs to be redelivered independently from rate control module 204. For example, reliability control module 202 may decide not to redeliver a lost packet to a real-time application when a timeout period for packet retransmission has expired and the packet has become stale, or when the packet is unimportant for the requesting application.

The decoupling of the reliability control module 202 from the rate control module 204 described above may allow the rate control functionality to appear in other layers above the transport layer, such as the session layer, the presentation layer, or the application layer 7. In other words, the TCP rate control may be used with other protocols without using the rest of the TCP protocol, which may be incompatible with these other protocols. For example, rate control module 204 may be implemented in the presentation layer or the application layer 7 to provide rate control for Real-time Transport Protocol (RTP) in the presentation layer or the application layer 7 to provide a rate-controlled RTP.

Figure 3:
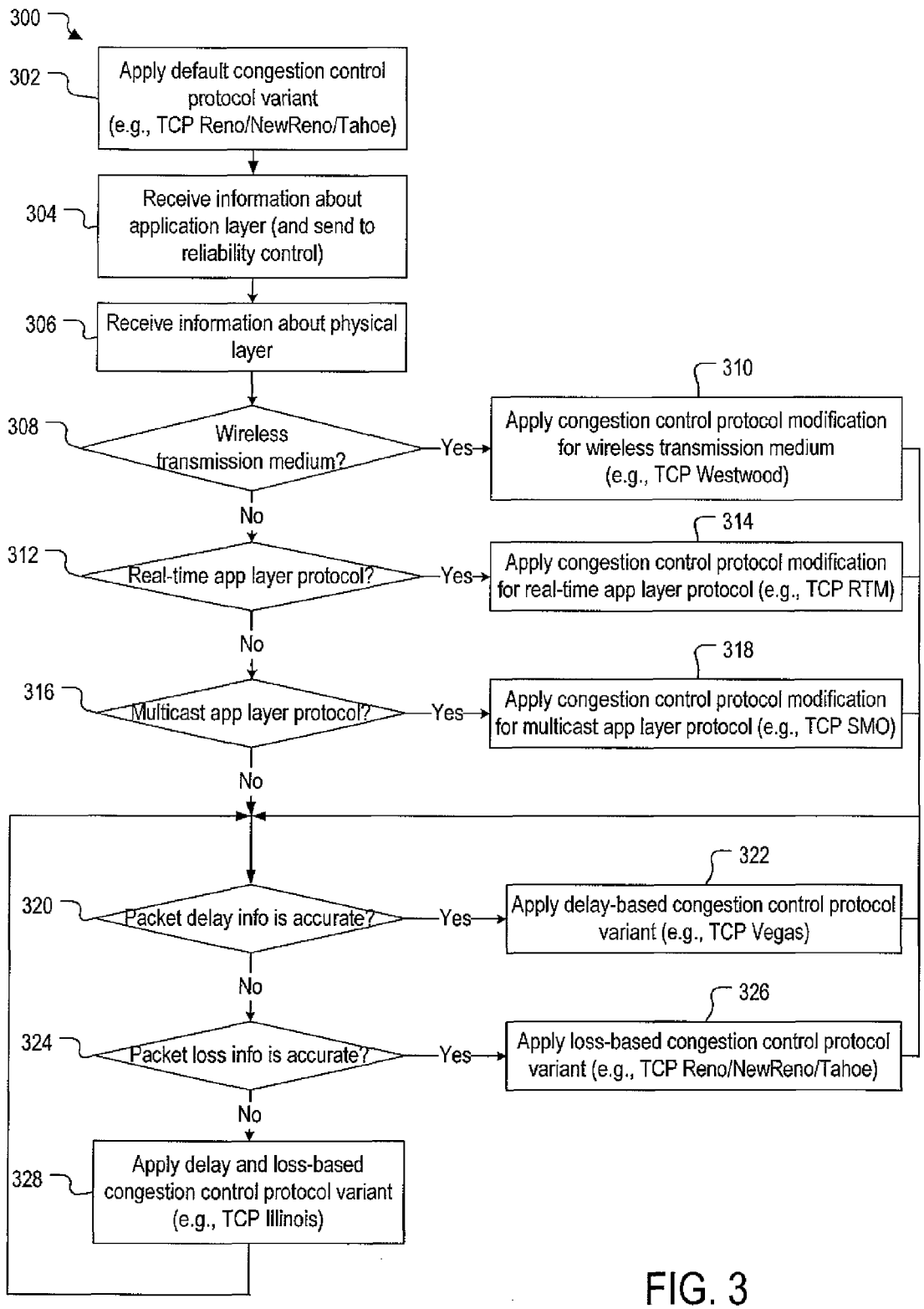
FIG. 3 is a flowchart of a method executed by a control logic of a rate control module of a TCP extension to select one of the congestion control protocol variants and one of the congestion control modifications.

FIG. 3 is a flowchart of a method 300 executed by a control logic 206 of a rate control module 204 of a TCP extension to select one of the congestion control protocol variants 208 and one of the congestion control modifications 218, arranged in accordance with at least some embodiments of the present disclosure.

Processing for method 300 begins at operation 302, where the control logic 206 may apply a default congestion control protocol variant for the TCP to start transmitting data to a receiver. The rate control module 204 may use a common congestion control protocol variant such as TCP Tahoe, TCP Reno, or TCP NewReno to start the session. Operation 302 may be followed by operation 304.

In operation 304, control logic 206 may receive information about the application layer 7. In some examples, control logic 206 may actively query for the information from the application layer 7, while in other examples control logic 206 may passively receive the information from the application layer 7. The application layer information (also referred elsewhere as "application needs") may include the nature of the application layer protocol and the data (e.g., real-time or multicast), the timeout period for retransmission of the data, and the quality of service (QoS) for the data. When the application layer information is passively received, it may be embedded in the header or the data from application layer 7. Control logic 206 may also send all or part of the application layer information to reliability control module 204. Operation 304 may be followed by operation 306.

In operation 306, control logic 206 may receive information about the physical layer 1. In some examples, control logic 206 may query for the information about the physical layer 1. The physical layer information (also referred elsewhere as "physical layer conditions") may include the transmission medium (e.g., wired or wireless), and the transmission and the loss rates of the network interface card (NIC). Operation 306 may be followed by operation 308.

In operation 308, control logic 206 may determine if the transmission medium is wireless by evaluating the information about the physical layer 1. If the transmission medium is wireless, then operation 308 may be followed by operation 310. Otherwise operation 308 may be followed by operation 312.

In operation 310, control logic 206 may apply a congestion control protocol modification that is adapted for a wireless transmission medium (e.g., TCP Westwood) to the current congestion control protocol variant. Operation 310 may be followed by operation 320.

In operation 312, control logic 206 may determine if the application layer 7 is a real-time application layer protocol for transmitting real-time data by evaluating the information about the application layer 7. Operation 312 may be followed by operation 314 when the application layer 7 is a real-time application layer protocol. Otherwise operation 312 may be followed by operation 316.

In operation 314, control logic 206 may apply a congestion control protocol modification that is adapted for a real-time application layer protocol (e.g., TCP RTM) to the current congestion control protocol variant. Operation 314 may be followed by operation 320.

In operation 316, control logic 206 may determine if the application layer 7 is a multicast application layer protocol for multicasting data by evaluating the information about the application layer 7. Operation 316 may be followed by operation 318 when the application layer 7 is a multicast application layer protocol. Otherwise operation 316 may be followed by operation 320.

In operation 318, control logic 206 may apply a congestion control protocol modification that is adapted for a multicast application layer protocol (e.g., TCP SMO) to the current congestion control protocol variant. Operation 318 may be followed by operation 320.

In operation 320, control logic 206 may determine if the packet delay is accurate based on the variation of the packet delay received from filter 216. Operation 320 may be followed by operation 322 when the packet delay is accurate. Otherwise operation 320 may be followed by operation 324.

In operation 322, control logic 206 may apply a delay-based congestion control protocol variant that uses the packet delay (e.g., TCP Vegas) because the packet delay was determined to be accurate. This congestion control protocol variant may be the same or different from the one selected in operation 302. This congestion control protocol variant may use the filtered packet delay from filter 216 to determine the congestion window size. Operation 322 may loop back to operation 320 where method 300 may repeat until all the data have been sent.

In operation 324, control logic 206 may determine if the packet loss is accurate based on the variation of the packet loss received from filter 214. Operation 324 may be followed by operation 326 when the packet loss is determined to be accurate. Otherwise operation 324 may be followed by operation 328 when the packet loss is determined to be not accurate (or inaccurate).

In operation 326, control logic 206 may apply a loss-based congestion control protocol variant that uses the packet loss (e.g., TCP Tahoe, Reno, or NewReno) because the packet loss is determined to be accurate. This congestion control protocol variant may be the same or different from the one selected in operation 302. This congestion control protocol variant may use the filtered packet loss from filter 214 to determine the congestion window size. Operation 326 may loop back to operation 320 where method 300 may repeat until all the data have been sent.

In operation 328, control logic 206 may apply a delay and loss-based congestion control protocol variant that uses both packet delay and packet loss (e.g., TCP Illinois) because neither was determined to be accurate (both are inaccurate). This congestion control protocol variant may be the same or different from the one selected in operation 302. This congestion control protocol variant may use the filtered packet delay and the filtered packet loss from filters 216 and 214, respectively, to determine the congestion window size. Operation 328 may loop back to operation 320 where method 300 may repeat until all the data have been sent.

Figure 4:
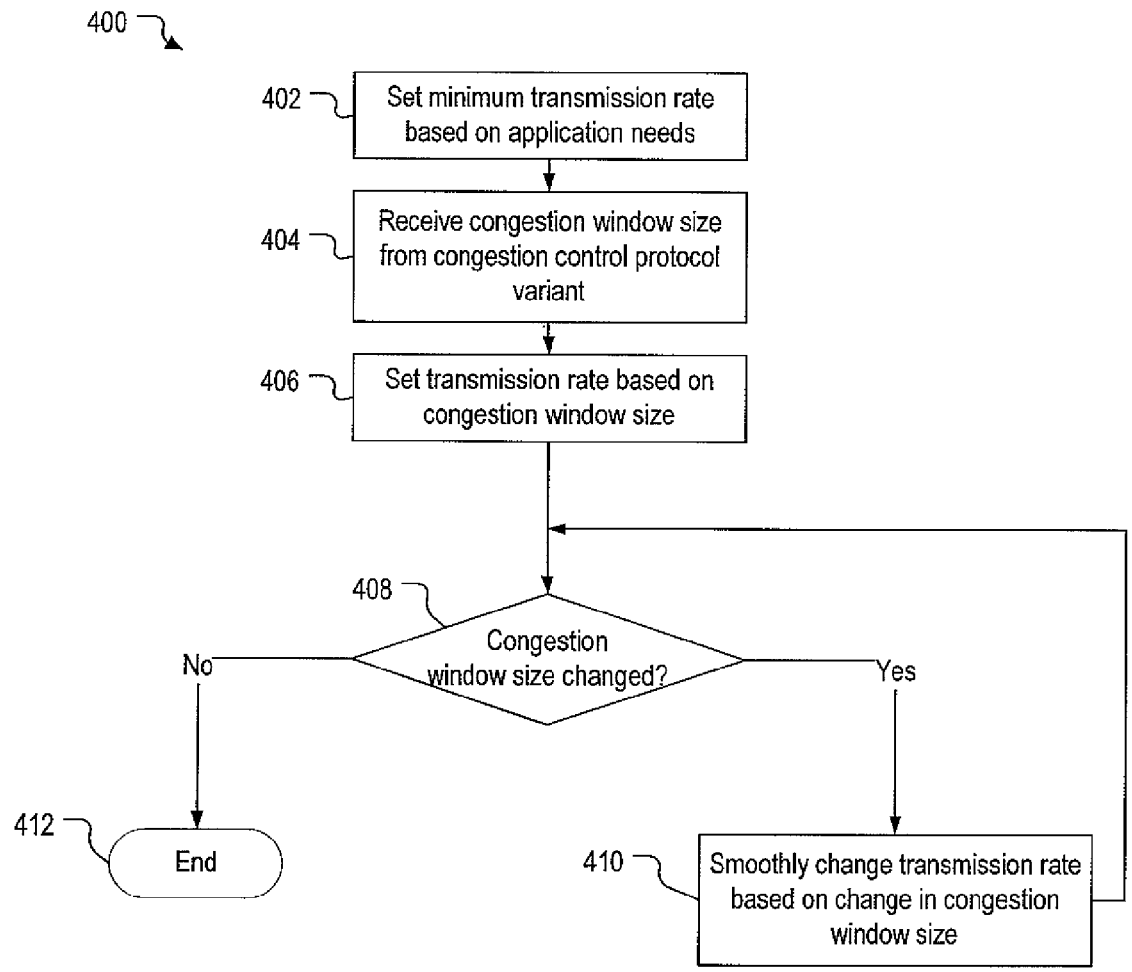
FIG. 4 is a flowchart of a method executed by a control logic in a rate control module of a TCP extension to set the transmission rate of the transmit buffer.

FIG. 4 is a flowchart of a method 400 executed by a control logic 206 in a rate control module 204 of a TCP extension to set the transmission rate of the transmit buffer, arranged in accordance with at least some embodiments of the present disclosure.

Processing for method 400 begins at operation 402, where control logic 206 may set a minimum that the transmission rate must exceed. The minimum transmission rate may be based on the application needs and it may be the slowest source rate from the application layer 7 (e.g., the most coarse granularity video codec). This may ensure that the application layer 7 functions in a minimal way. Operation 402 may be followed by operation 404.

In operation 404, control logic 206 may receive the congestion window size from the congestion control (e.g., the congestion control protocol variant and modification selected in method 300). Note that the congestion control protocol variant and modification may determine the appropriate congestion window size based on the packet loss, the packet delay, the application needs (e.g., the QoS requirements) and the physical layer conditions (e.g., the transmission and the loss rates). Operation 404 may be followed by operation 406.

In operation 406, control logic 206 may set the transmission rate based on the congestion window size. In some examples, the transmission rate may be set proportional to the congestion window size. In some embodiment, the transmission rate may be equal to the product of the congestion window size and the packet size divided by the round-trip time (RTT). Operation 406 may be followed by operation 408.

In operation 408, control logic 206 may determine if the congestion control has changed the congestion window size. Operation 408 may be followed by operation 410 when the congestion window size has changed. Otherwise operation 408 may be followed by step 412 that may end method 400.

In operation 410, control logic 206 may smoothly adjusts (or change) the transmission rate in response to changes in the congestion window size. The transmission rate may be passed through a low pass filter so that the fluctuation of the transmission rate does not degrade the performance of the application layer 7. Note that control logic 206 may not allow the transmission rate to fall below the minimum transmission rate set in operation 402. Operation 410 may loop back to operation 408 to detect changes in the congestion window size.

Figure 5:
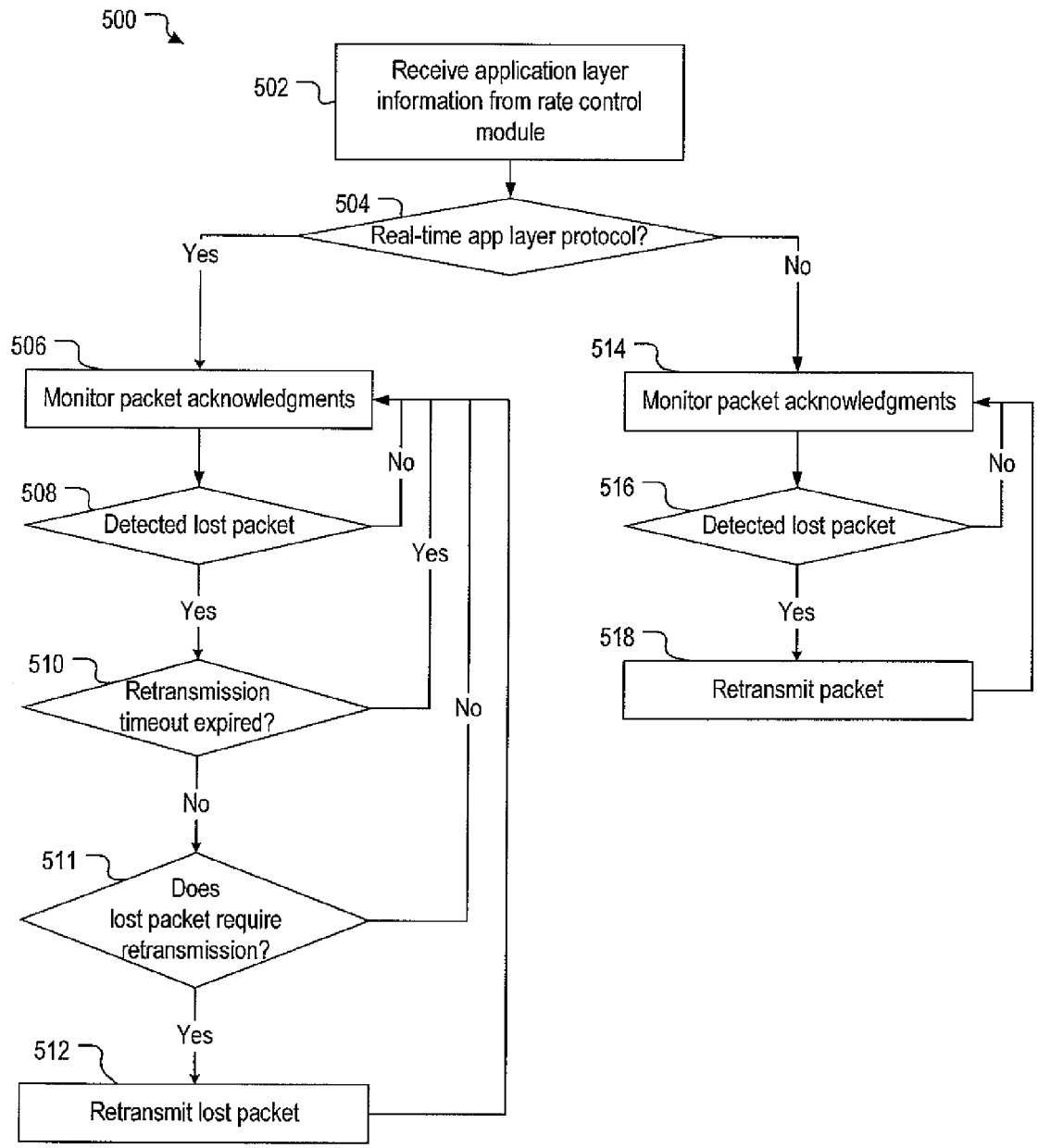
FIG. 5 is a flowchart of a method executed by a reliability control module in a TCP extension.

FIG. 5 is a flowchart of a method 500 executed by a reliability control module 202 in a TCP extension, in accordance with at least some embodiments of the present disclosure.

Processing for method 500 begins at operation 502, where reliability control module 202 may receive the application layer information from control logic 206 of rate control module 204. As described above, the application layer information may include the nature of the application and its data, and the timeout period for retransmission of a packet. Operation 502 may be followed by operation 504.

In operation 504, reliability control module 202 may determine if the application layer 7 is a real-time application layer protocol for transmitting real-time data by evaluating the application layer information. Operation 504 may be followed by operation 506 when the application layer 7 is determined to be a real-time application layer protocol. Otherwise operation 504 may be followed by operation 514 when the application layer 7 is determined to not be a real-time application layer protocol.

In operation 506, reliability control module 202 may monitor packet acknowledgements from the receiver to detect a lost packet. For example, a packet may be lost when three duplicate packet acknowledgements have been received or a timeout expires before a packet acknowledgement is received for the packet. Operation 506 may be followed by operation 508.

In operation 508, reliability control module 202 may determine if a lost packet has been detected. Operation 508 may be followed by operation 510 when a lost packet is detected. Otherwise operation 508 may loop back to operation 506 where reliability control module 202 may continue to monitor the packet acknowledgments from the receiver.

In operation 510, reliability control module 202 may determine if the timeout period for retransmission has expired for the lost packet so it is unnecessary to retransmit that packet as it has become stale. Operation 510 may loop back to operation 506 where reliability control module 202 may continue to monitor the packet acknowledgements from the receiver. Otherwise operation 510 may be followed by operation 511.

In operation 511, reliability control module 202 may determine if the lost packet requires retransmission. Operation 511 may followed by operation 512 when the lost packet must be retransmitted. Otherwise operation 511 may loop back to operation 506 where reliability control module 202 may continue to monitor the packet acknowledgements from the receiver. Whether or not a lost packet must be retransmitted depends on the importance of its payload, and the importance of the payload may be indicated by bits in the header or the data from the application layer 7. In one embodiment where the packets contain MPEG data, reliability control module 202 may not retransmit a lost packet with B frame (bidirectionally-predictive-coded frame) data because it is less important than packets with I frame (intra-coded frame) data and P frame (predictive-coded frame) data. To determine if a packet is important, reliability control module 202 may read the headers of the MPEG data to identify control bits that indicate the frame type of the MPEG data.

In operation 512, reliability control module 202 may retransmit the lost packet. Operation 512 may loop back to operation 506 where reliability control module 202 may continue to monitor the packet acknowledgments from the receiver.

In operation 514, reliability control module 202 may monitor packet acknowledgements from the receiver to detect a lost packet. Operation 514 may be followed by operation 516.

In operation 516, reliability control module 202 may determine if a lost packet has been detected. Operation 516 may be followed by operation 518 when a lost packet is detected. Otherwise operation 516 may loop back to operation 514 where reliability control module 202 may continue to monitor the packet acknowledgments from the receiver.

In operation 518, reliability control module 202 may retransmit the lost packet. Operation 518 may loop back to operation 514 where reliability control module 204 may continue to monitor the packet acknowledgments from the receiver.

Figure 6:
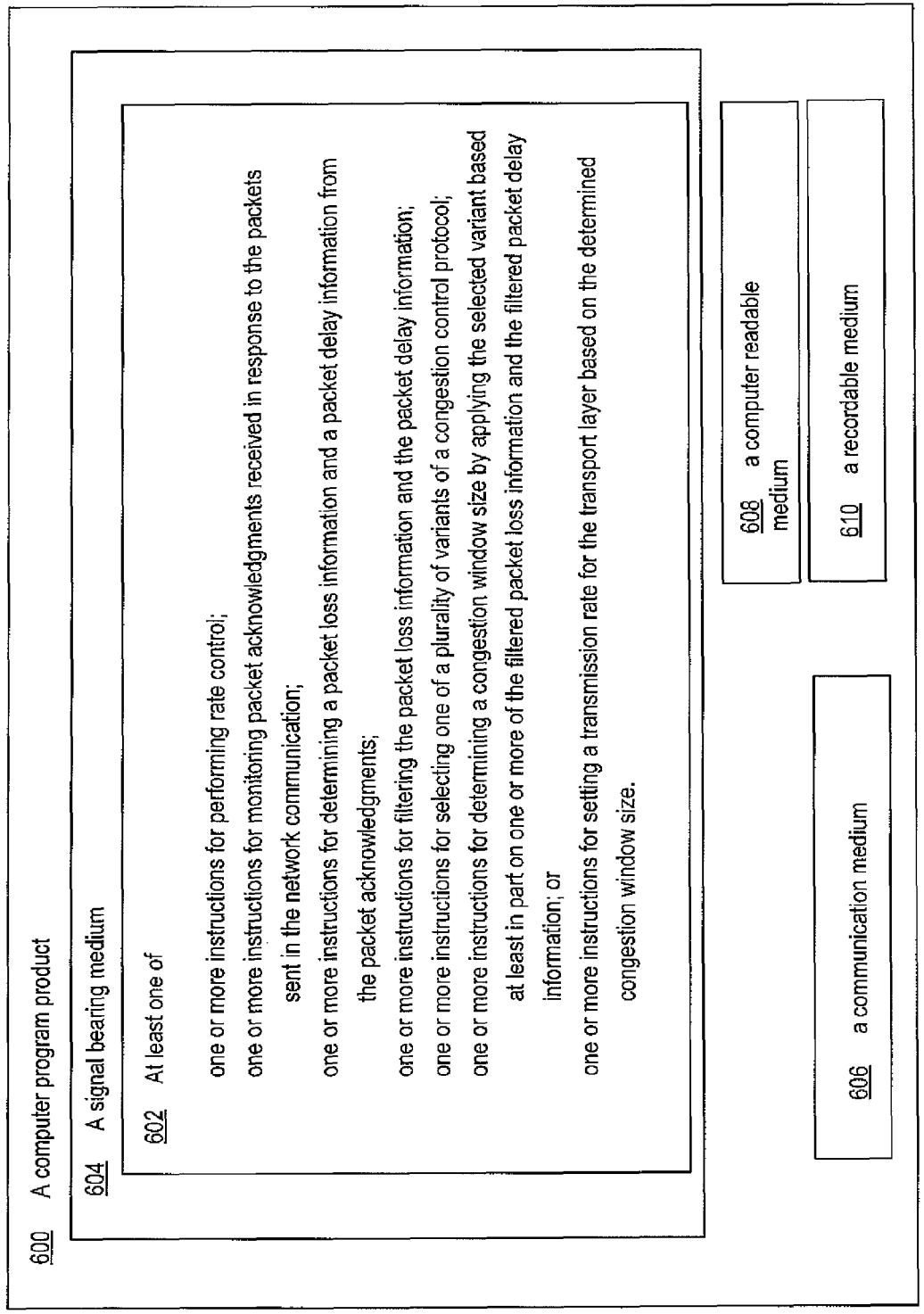
FIG. 6 is a block diagram illustrating a computer program product of a TCP extension, all arranged in accordance with at least some embodiments of the present disclosure.

FIG. 6 is a block diagram illustrating a computer program product 600 of a TCP extension, arranged in accordance with at least some embodiments of the present disclosure. Computer program product 600 includes one or more sets of instructions 602 for executing the methods of the TCP extension. Computer program product 600 may be transmitted in a signal bearing medium 604 or another similar communication medium 606. Computer program product 600 may be recorded in a computer readable medium 608 or another similar recordable medium 610.

Although specific TCP modes and modifications have been mentioned, other existing and future TCP modes and modifications may be selected based on application needs, physical layer conditions, and local observables. For example TCP modes and modifications that use explicit signal for the network congestion level, such as BicTCP, MaxNet, RCP, and XCP, may also be used.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "Including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for a device to implement a network protocol stack comprising an application layer, a transport layer, a physical layer, and at least one layer between the application layer and the transport layer, the network protocol stack at least sending packets in a network communication, the method comprising:
    performing rate control in a session, comprising:
        monitoring packet acknowledgments received in response to the packets sent in the network communication;
        determining a packet loss information and a packet delay information from the packet acknowledgments;
        filtering the packet loss information and the packet delay information;
        selecting one of a plurality of variants of a congestion control protocol in real-time within the session, comprising:
            evaluating the packet delay information to determine if the packet delay information is accurate;
            evaluating the packet loss information to determine if the packet loss information is accurate;
            selecting a first variant with congestion control based on the packet delay information when the packet delay information is determined to be accurate;
            selecting a second variant with congestion control based on the packet loss information when the packet loss information is determined to be accurate; and
            selecting a third variant with congestion control based on the packet delay information and the packet loss information when the packet delay information and the packet loss information are both determined to be inaccurate;
        determining a congestion window size by applying the selected variant based at least in part on one or more of the filtered packet loss information and the filtered packet delay information; and
        setting a transmission rate for the transport layer based on the determined congestion window size.

2. The method of claim 1, wherein the accuracy of the packet delay information depends on a variation in values of the packet delay information, and the accuracy of the packet loss information depends on a variation in values of the packet loss information.

3. The method of claim 1, further comprising changing between two of the first, the second, and the third variants in the same session.

4. The method of claim 1, further comprising selecting one of a plurality of modifications to the selected variant.

5. The method of claim 4, wherein selecting one of plurality of modifications to the selected variant comprises:
    receiving information about the application layer and the physical layer;
    when the physical layer information indicates a wireless transmission medium, selecting a first modification suitable for the wireless transmission medium;
    when the application layer information indicates a real-time application layer protocol, selecting a second modification suitable for the real-time application protocol; and
    when the application layer information indicates a multicast application protocol, selecting a third modification suitable for the multicast application protocol.

6. The method of claim 1, wherein filtering the packet loss information and the packet delay information comprises assigning different weights to the packet loss information and the packet delay information.

7. The method of claim 6, wherein determining the packet loss information and the packet delay information comprises sampling the packet loss information and the packet delay information at different rates.

8. The method of claim 6, wherein filtering the packet loss information and the packet delay information further comprises determining moving averages of the packet loss information and the packet delay information.

9. The method of claim 1, further comprising performing reliability control independent from rate control.

10. The method of claim 9, wherein performing reliability control and performing rate control both occur in the transport layer.

11. The method of claim 9, wherein performing reliability control independent from rate control comprises:
receiving information about the application layer;
detecting a lost packet from the packet acknowledgments; and
retransmitting the lost packet when a timeout period for retransmission has not expired for the lost packet, the timeout period for retransmission being specified in the application layer information.

12. The method of claim 9, wherein performing reliability control independent from rate control comprises:
detecting a lost packet from the packet acknowledgments;
determining if the lost packet is to be retransmitted; and
retransmitting the lost packet when the lost packet is to be retransmitted.

13. The method of claim 12, wherein determining if the lost packet is to be retransmitted comprises evaluating either a header or the data from the application layer to assess importance of the lost packet.

14. The method of claim 9, wherein performing rate control occurs in a layer above the transport layer and the transport layer comprises a non-TCP protocol.

15. The method of claim 1, further comprising determining retransmission of a lost packet based on conditions associated with at least one of the application layer, the transport layer, and the physical layer.

16. A non-transitory computer-readable storage medium encoded with computer-executable instructions for a device to implement a network protocol stack comprising an application layer, a transport layer, a physical layer, and at least one layer between the application layer and the transport layer, the network protocol stack at least sending packets in a network communication, the instructions comprising:
performing rate control in a session, comprising:
monitoring packet acknowledgments received in response to the packets sent in the network communication;
determining a packet loss information and a packet delay information from the packet acknowledgments;
filtering the packet loss information and the packet delay information;
selecting one of a plurality of variants of a congestion control protocol in real-time within the session, comprising:
evaluating the packet delay information to determine if the packet delay information is accurate;
evaluating the packet loss information to determine if the packet loss information is accurate;
selecting a first variant with congestion control based on the packet delay information when the packet delay information is determined to be accurate;
selecting a second variant with congestion control based on the packet loss information when the packet loss information is determined to be accurate; and
selecting a third variant with congestion control based on the packet delay information and the packet loss information when the packet delay information and the packet loss information are both determined to be inaccurate;
determining a congestion window size by applying the selected variant based at least in part on one or more of the filtered packet loss information and the filtered packet delay information; and
setting a transmission rate for the transport layer based on the determined congestion window size.

17. The non-transitory computer-readable storage medium of claim 16, wherein the accuracy of the packet delay information depends on a variation in values of the packet delay information, and the accuracy of the packet loss information depends on a variation in values of the packet loss information.

18. The non-transitory computer-readable storage medium of claim 16, wherein the instructions further comprise changing between two of the first, the second, and the third variants in the same session.

19. The non-transitory computer-readable storage medium of claim 16, wherein the instructions further comprise selecting one of a plurality of modifications to the selected variant.

20. The non-transitory computer-readable storage medium of claim 19, wherein selecting one of plurality of modifications to the selected variant comprises:
receiving information about the application layer and the physical layer;
when the physical layer information indicates a wireless transmission medium, selecting a first modification suitable for the wireless transmission medium;
when the application layer information indicates a real-time application layer protocol, selecting a second modification suitable for the real-time application protocol; and
when the application layer information indicates a multicast application protocol, selecting a third modification suitable for the multicast application protocol.

21. The non-transitory computer-readable storage medium of claim 16, wherein filtering the packet loss information and the packet delay information comprises assigning different weights to the packet loss information and the packet delay information.

22. The non-transitory computer-readable storage medium of claim 21, wherein determining the packet loss information and the packet delay information comprises sampling the packet loss information and the packet delay information at different rates.

23. The non-transitory computer-readable storage medium of claim 21, wherein filtering the packet loss information and the packet delay information further comprises determining moving averages of the packet loss information and the packet delay information.

24. The non-transitory computer-readable storage medium of claim 16, wherein the instructions further comprise performing reliability control independent from rate control.

25. The non-transitory computer-readable storage medium of claim 24, wherein performing reliability control and performing rate control both occur in the transport layer.

26. The non-transitory computer-readable storage medium of claim 24, wherein performing reliability control independent from rate control comprises:
receiving information about the application layer;
detecting a lost packet from the packet acknowledgments; and
retransmitting the lost packet when a timeout period for retransmission has not expired for the lost packet, the timeout period for retransmission being specified in the application layer information.

27. The non-transitory computer-readable storage medium of claim 24, wherein performing reliability control independent from rate control comprises:
detecting a lost packet from the packet acknowledgments;
determining if the lost packet is to be retransmitted; and retransmitting the lost packet when the lost packet is to be retransmitted.

28. The non-transitory computer-readable storage medium of claim 27, wherein determining if the lost packet is to be retransmitted comprises evaluating either a header or the data from the application layer to assess importance of the lost packet.

29. The non-transitory computer-readable storage medium of claim 24, wherein performing rate control occurs in a layer above the transport layer and the transport layer comprises a non-TCP protocol.

30. The non-transitory computer-readable storage medium of claim 16, wherein the instructions further comprise determining retransmission of a lost packet based on conditions associated with at least one of the application layer, the transport layer, and the physical layer.

31. A rate control module adapted to facilitate a network protocol stack including an application layer, a transport layer, a physical layer, and at least one layer between the application layer and the transport layer, the rate control module comprising:
   a packet loss detection block configured to detect packet loss information from packet acknowledgements received in the transport layer;
   a first filter configured to filter the packet loss information from the packet loss detection block;
   a packet delay block configured to detect packet delay information from the packet acknowledgements;
   a second filter configured to filter packet delay information from the packet delay block;
   a plurality of variants of a congestion control protocol configured to generate a congestion window size from at least one of information about the application layer, information about the physical layer, the filtered packet loss, and the filtered packet delay; and
   a control logic configured to:
      select one of the plurality of variants based on the filtered packet loss and the filtered packet delay, comprising:
         evaluating the packet delay information to determine if the packet delay information is accurate;
         evaluating the packet loss information to determine if the packet loss information is accurate;
         selecting a first variant with congestion control based on the packet delay information when the packet delay information is determined to be accurate;
         selecting a second variant with congestion control based on the packet loss information when the packet loss information is determined to be accurate; and
         selecting a third variant with congestion control based on the packet delay information and the packet loss information when the packet delay information and the packet loss information are both determined to be inaccurate; and
      set a transmission rate based on the congestion window size.

32. The rate control module of claim 31, further comprising a plurality of modifications for at least one of the plurality of variants, and the control block is further configured to select one of the plurality of modifications based on one or more of the application layer information and the physical layer information.

33. The rate control module of claim 31, wherein the rate control module is located in a layer above the transport layer, the congestion control protocol is a TCP congestion control protocol, and the transport layer comprises a non-TCP protocol.

* * * * *